United States Patent [19]

Lattig

[11] 3,985,204
[45] Oct. 12, 1976

[54] TREE STAND

[76] Inventor: Gerald E. Lattig, R.D. No. 1, P.O. Box 120, Dauphin, Pa. 17018

[22] Filed: Oct. 21, 1975

[21] Appl. No.: 624,541

[52] U.S. Cl. .................................. 182/223; 182/92
[51] Int. Cl.² .......................................... E04G 5/08
[58] Field of Search ................ 182/223, 187, 92; 61/41, 45

[56] References Cited
UNITED STATES PATENTS

| | | | |
|---|---|---|---|
| 1,187,078 | 6/1916 | May | 182/187 |
| 3,282,378 | 11/1966 | Pierce | 182/223 |
| 3,762,502 | 10/1973 | Lawson | 182/223 |

*Primary Examiner*—Reinaldo P. Machado
*Attorney, Agent, or Firm*—Thomas Hooker

[57] ABSTRACT

A tree stand for supporting a load, conventionally a person, above ground between a pair of spaced tree trunks or branches includes a pair of legs hinged together with spikes on the ends of the legs so that the stand may be positioned between the tree in the foreshortened condition and then forced to an elongated position to extend the spikes into the trees so that they support the stand.

2 Claims, 5 Drawing Figures

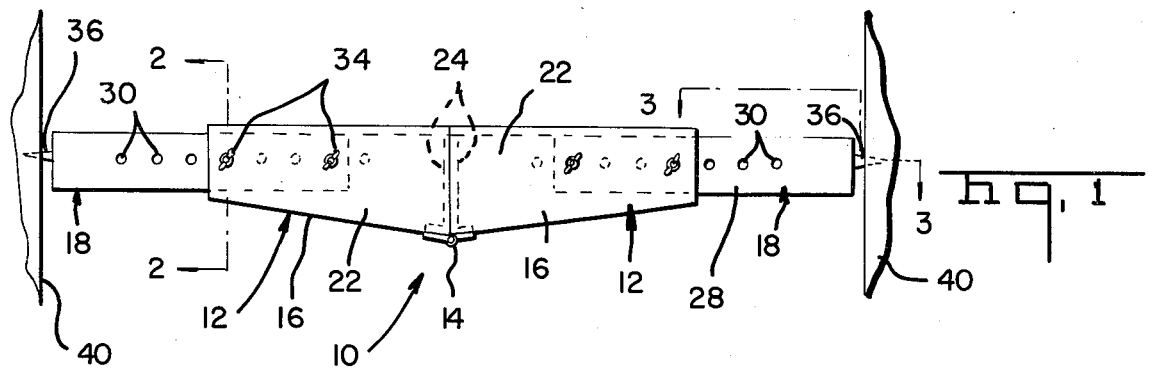
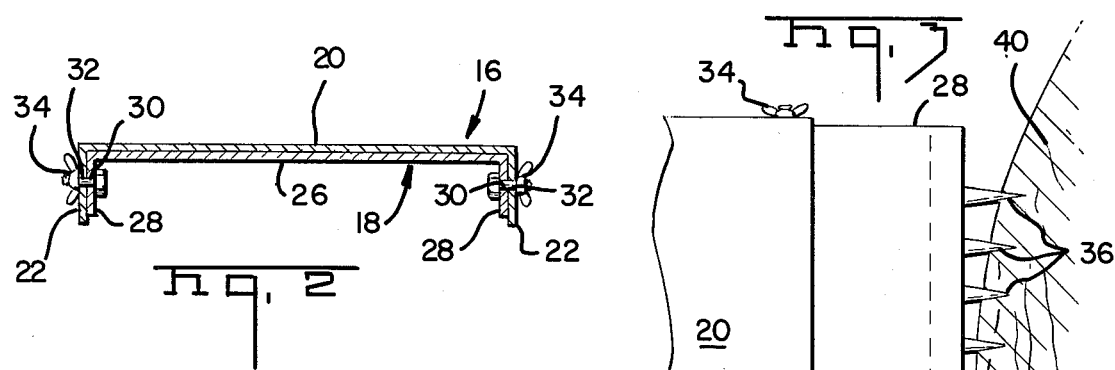
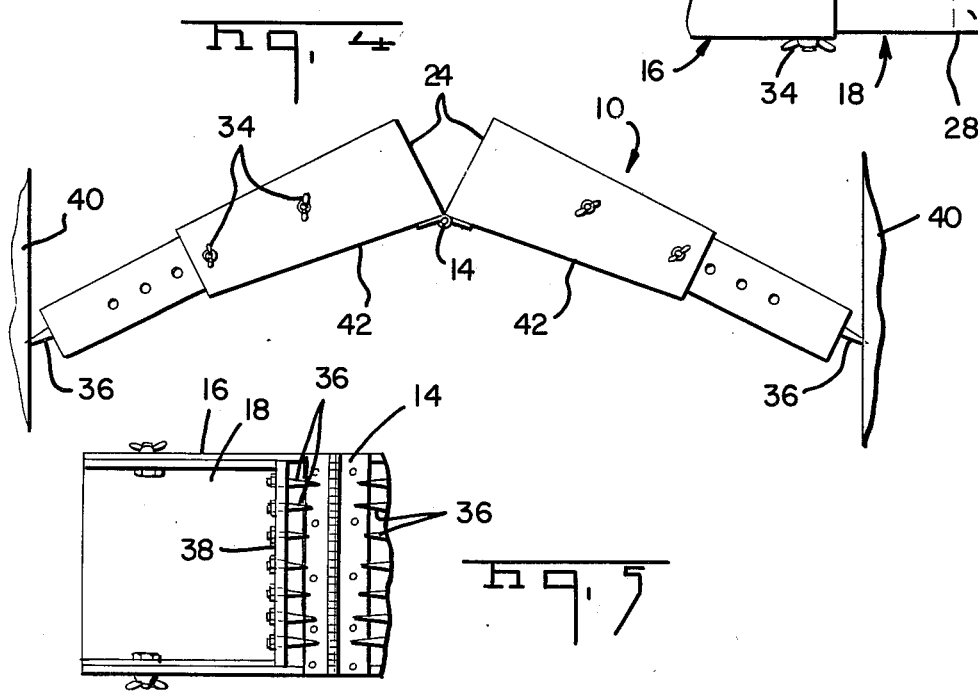

TREE STAND

The invention relates to tree stands of the type used by hunters, naturalists, or others desiring to be supported on trees above ground level in order to more readily observe wild life or for other purposes. Conventional tree stands are intended for mounting on a trunk of a single tree and include a chair or bench with a strap or other device extending from the chair around the trunk to support the chair and facilitate upward movement of the chair on the trunk. These types of supports have a number of disadvantages including a limited support area and tendency to pivot or swivel on the tree when in use. Further, they are bulky and difficult to carry through the woods to the tree where they are to be used.

The present tree stand is mounted between a pair of spaced trees, branches, or even a pair of poles and includes two light weight support legs which are hinged together at one end with spikes extending from the free ends of the legs. The stand is easily and compactly collapsed into a bundle for carrying through the underbrush to the desired site where it is to be mounted on trees or poles. When collapsed, the spikes are confined within the bundle to prevent injury.

The stand is erected between the selected trees by adjusting the lengths of the legs so that the stand spans the trees when the support surfaces on the legs are in the horizontal position. Following this, the legs are bent toward each other about the joining hinge and the spikes are moved together sufficiently to permit the stand to be positioned between the trees with the spikes lightly engaging the trees at the same level. The stand is then pulled down so that end faces of the legs abut each other and prevent further downward collapse of the stand. During the downward motion of the stand the spikes are forced into the trees, thereby rigidly securing the support on the trees. The spaced spikes prevent tipping of the stand.

A number of spikes extend from the end of each leg to assure that a rigid connection is made with the trees. The spikes at the sides of the legs extend further away from the leg end than those nearer the middle of the leg so that the tips of the spikes follow a concave line approximately the shape of the tree into which they are forced. In this way, all of the spikes are forced into the generally cylindrical trunks or posts which support these tree stands.

Other objects and features of the invention will become apparent as the description proceeds, especially when taken in conjunction with the accompanying drawings illustrating the invention, of which there is one sheet.

IN THE DRAWINGS

FIG. 1 is a side view of a tree stand according to the invention erected between two adjacent tree trunks or limbs;

FIGS. 2 and 3 are views taken respectively along lines 2—2 and 3—3 of FIG. 1;

FIG. 4 is a view similar to FIG. 1 illustrating the tree stand as it is being mounted on the trees; and FIG. 5 is a view of the underside of one half of the tree stand in the collapsed position.

Tree stand 10 includes a pair of like adjustable legs 12 secured together by hinge 14. Each leg includes a leg member 16, and an extension member 18. Members 16 and 18 as shown are formed from sheet metal stock, although they may be formed from other materials if desired. Each leg member 16 is U or channel shaped in transverse cross section and includes a top 20 with sides 22 extending along the edges of the top away from the hinge. An end wall 24 joins the top 20 and sides 22 at the hinge-end of the leg. The plates of the hinge 14 are suitably secured to the sides of the end walls 24 away from the tops 20. Extension members 18 are also U or channel shaped in transverse cross section and are snugly nested within the leg members 16 with top 26 against top 20 and sides 28 against sides 22 as illustrated in FIG. 2.

A series of spaced mounting holes 30 are formed through sides 28 of members 18 and a pair of spaced mounting holes 32 are formed through sides 22 of leg members 16 so that the members in each leg may be secured together as illustrated in FIGS. 1 and 2 by a pair of bolts 34 extending through aligned pairs of holes 30, 32 on each side of each leg. The length of the stand may be adjusted by securing the members 16 and 18 together using openings 30 in the extension members 18 as desired. Preferably, the legs are of equal length.

A number of tree-engaging pointed spikes 36 extend outwardly of the end wall 38 of extensions 18 as shown in FIG. 3. The spikes are spaced across the width of the end wall with the spikes nearest the sides 28 extending further away from the end wall than the spikes adjacent the middle of the end wall. In this way, the tips of the spikes define a concave line as shown in FIG. 3 roughly approximating the surface of the tree trunk 40 to facilitate engagement with trunks or limbs during mounting of the tree stand 10. When the stand is extended, the spikes are above the pivot of hinge 14.

The tree stand is intended to be mounted between a pair of relatively closely spaced tree trunks, limbs, or poles 40 so that the spikes 36 extend into the trunks as shown in FIG. 1 with the horizontal stand extending between the trunks and supported by the spikes. Following the selection of a site where the tree stand is to be mounted, the length of each leg is adjusted so that the stand, when in the horizontal position as shown in FIG. 1, bridges the distance between the trees. The stand is then lifted to an elevated position as shown in FIG. 4 with the legs bent together with respect to each other about the central hinge 14 and with the spikes 36 lightly engaging the trunks 40. In this way, the tree stand is easily positioned at a height sufficiently above ground level that the person erecting the stand may hold onto the upper support surfaces on the tops of the arms adjacent the end walls 24 and pulled downwardly, thereby moving the tree stand from the position of FIG. 4 to the mounted position of FIG. 1. The collapse of the stand during mounting extends the spikes 36 sufficiently deeply into the wood of supports 40 to rigidly mount the stand on the supports. When the tree stand is fully extended the end walls 24 of both legs abut each other and prevent further downward collapse of the stand beyond the horizontal position. As shown in FIG. 3, the concave arrangement of the spikes 36 assures that all of the spikes extend about the same depth into the rounded trunk or limb 40, thereby contributing to the support of the stand and preventing tipping or twisting of the stand when it is mounted or supports a person. In use, a person may stand or sit on the stand. The stand is removed from the trunks 40 by pushing up on the legs at the hinge to withdraw the spikes.

During collapse of the tree stand from the position of FIG. 4 to that of FIG. 1, the length of the stand is increased by a fixed amount resulting in that the spikes at each end of the stand penetrate the supports 40 a fixed distance. Because the hardness of the wood in different types of trees varies, it may be desirable in certain instances to shorten the legs of the stand when the stand is to be mounted between hardwood trees of a given spacing over the length of the legs when the stand is to be mounted on softwood trees spaced apart the same distance. While there would be less penetration of the spikes into the hardwood, the strength of the wood assures that the stand is rigidly mounted.

As illustrated in FIG. 5, the leg extensions 18 of tree stand 10 may be mounted in the hollow of leg members 16 with the spikes 36 extending toward end walls 26. In this position, the legs are shortened and the sharp spikes are surrounded by the leg member 16 to prevent accidental injury. The tree stand 10 may then be further collapsed by pivoting the legs about hinge 14 until the lower edges 42 of sides 22 engage each other. In this position, the stand forms a compact bundle which may be easily and safely carried to the place of use. When the stand is to be used, the legs 12 are readily adjusted to the span between the supporting trees and the support is mounted as previously described.

While I have illustrated and described a perferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A tree stand for mounting between a pair of spaced trees or the like, the stand comprising a pair of adjustable legs, each leg including channel-shaped leg and extension members nested one within the other, locking members adjustably securing the sides of the leg and extension members of each leg together so that the length of the legs may be changed as desired; a hinge joining inner ends of the leg members; and a number of tree-engaging spikes extending outwardly from the free ends of the extension members at a level above the pivot of the hinge when the tree stand is horizontally extended, the tips of the spikes on each extension member lying on a concave line extending generally across the width of the leg; whereby the stand may be positioned between the trees with the legs bent at an angle to each other, the spikes positioned adjacent the opposing surfaces of the trees and the pivot of the hinge located above the spikes and then moved to an extended position where the legs extend straight across the space between the trees with the spikes buried in the trees above the hinge pivot.

2. A tree support as in claim 1 wherein said locking members comprise a series of holes formed through both sides of the leg and extension members with bolts extending through aligned holes on each side of each leg.

* * * * *